United States Patent [19]

Pham Van Cang

[11] 4,030,120

[45] June 14, 1977

[54] PROCESSING ARRANGEMENT AND CORRECTING DEVICE FOR COLOR TELEVISION SIGNALS

[75] Inventor: Luc Pham Van Cang, Paris, France

[73] Assignee: Thomson-CSF, Paris, France

[22] Filed: Dec. 17, 1975

[21] Appl. No.: 641,668

[30] Foreign Application Priority Data

Dec. 24, 1974  France .............................. 74.42636

[52] U.S. Cl. .................................. 358/27; 358/34
[51] Int. Cl.² ...................................... H04N 9/535
[58] Field of Search .................... 358/21, 27, 34; 128/DIG. 26, 2.3 DC, 2.5 DC

[56] References Cited

UNITED STATES PATENTS

| 2,798,900 | 7/1957 | Bradley | 358/27 |
|---|---|---|---|
| 3,887,938 | 6/1975 | Cecchin | 358/27 |
| 3,962,723 | 6/1976 | Srivastava | 358/27 |

Primary Examiner—Benedict V. Safourek
Assistant Examiner—Aristotelis M. Psitos
Attorney, Agent, or Firm—Cushman, Darby & Cushman

[57] ABSTRACT

A processing arrangement making it possible on the one hand to measure the amplitude of the horizontal sync. pulses and correct them, in order to give them a predetermined amplitude, and on the other hand to measure the amplitude of a signal at the frequency of the chrominance sub-carrier, and to correct it in order to give it a predetermined amplitude, the two amplitudes references thus introduced into the video signal forming, at the time of reception (or read-out) of the signal, absolute references which are used to automatically correct distortions produced in the signal.

6 Claims, 4 Drawing Figures

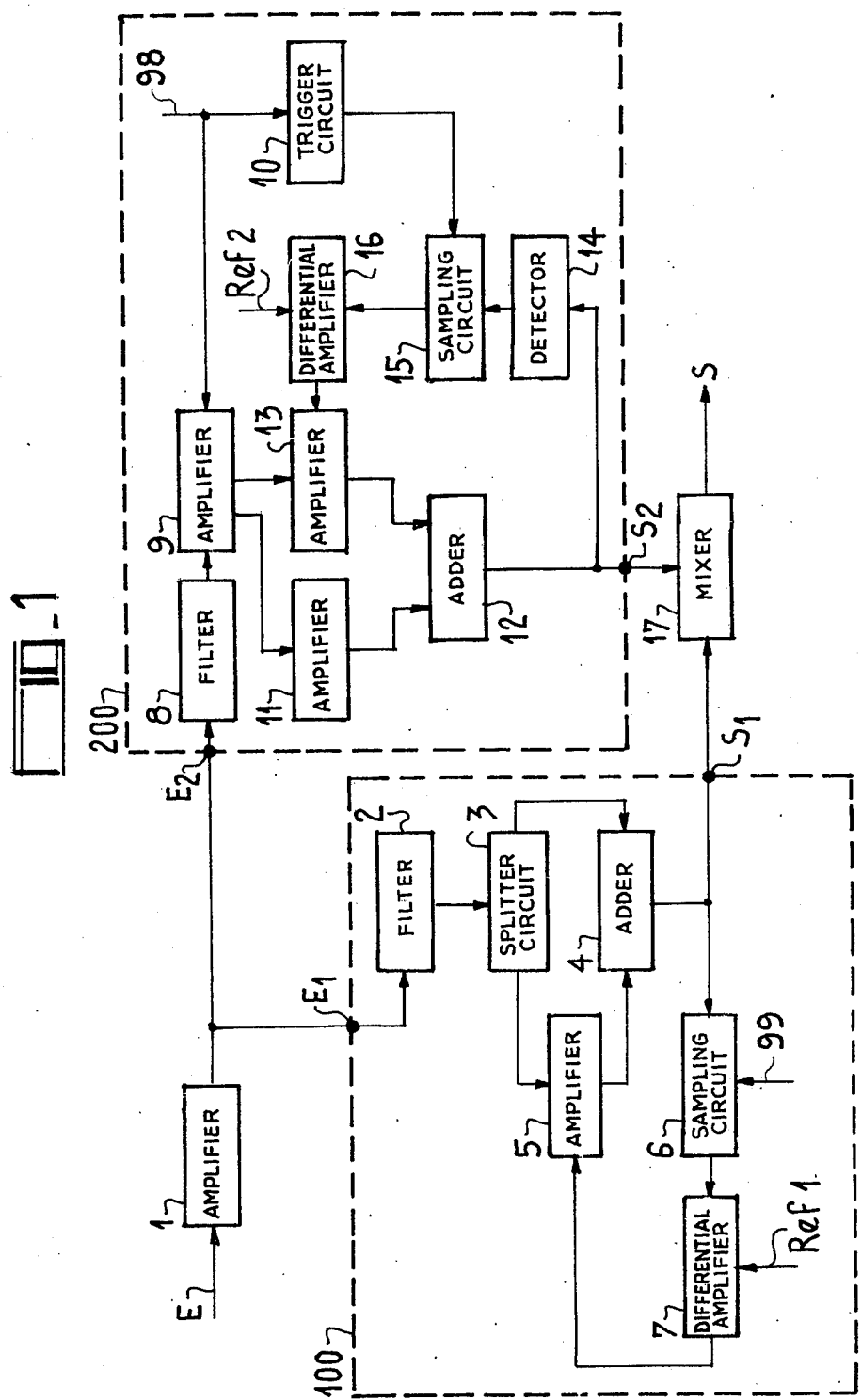

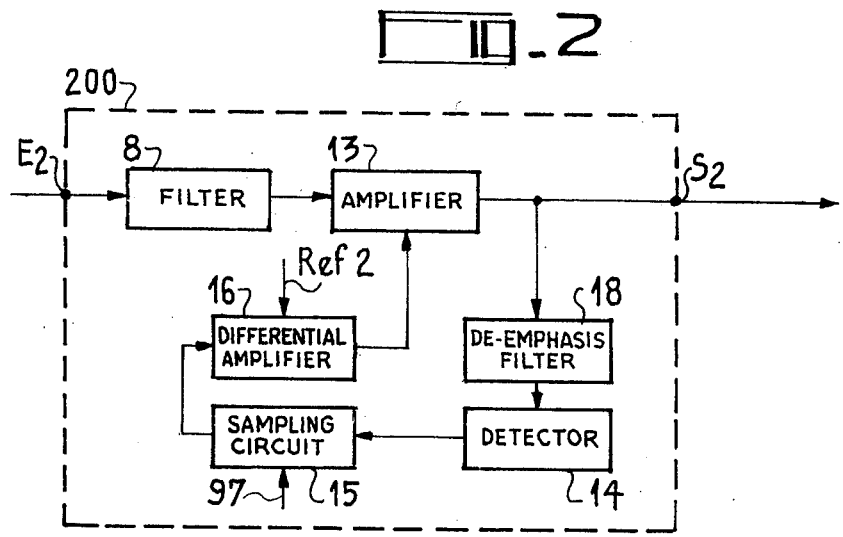
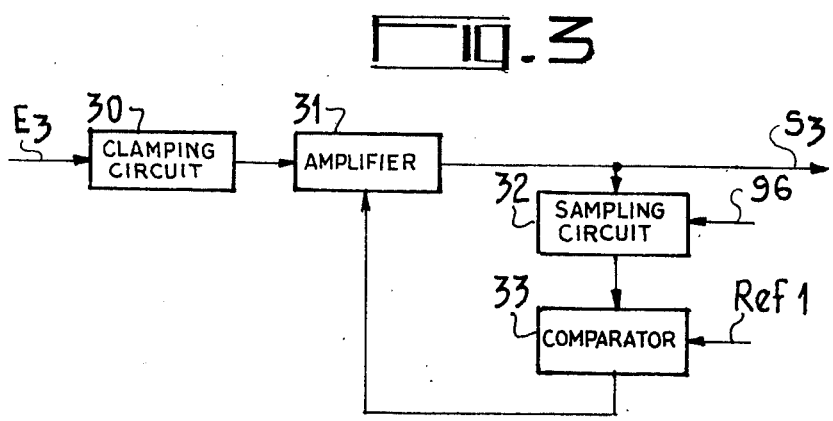
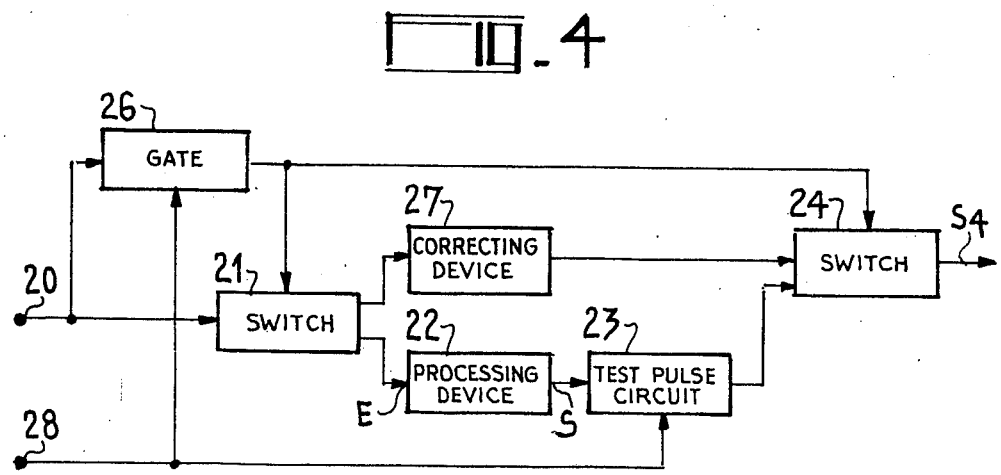

PROCESSING ARRANGEMENT AND CORRECTING DEVICE FOR COLOR TELEVISION SIGNALS

The present invention relates to colour television systems and more particularly to an arrangement for processing the composite video signal (comprising the luminance, chrominance and synchronising signals) prior to transmission or recording, in order to reconstitute it with a correct amplitude.

In the NTSC and PAL systems as they currently exist, amplitude correction devices of this kind are already known which go by the name of "Autochroma" and which make it possible, at read-out or on reception, to automatically correct the higher frequency part of the spectrum, comprising the chromonance sub-carrier, by using as reference the amplitude of the burst signal, which is assumed to have been correct at the time of recording (or transmission).

Another correcting arrangement, more particularly applicable to systems in which read-out of the composite video signal is performed sequentially in several channels (for example by means of a magnetoscope with four read-out heads), makes it possible, by reference to the amplitude of the first signal recorded in one of the channels, to correct the amplitude of the signals supplied by the other channels.

These known arrangement operate correctly if the amplitude of the signal has its nominal value, and provided that the gain of the demodulator is precisely adjusted to unity. If, due for example to drift effects, the signal does not have its nominal value or the demodulated gain is not correct, these arrangement may introduce unwanted corrections.

The object of the present invention is an arrangement for processing video signals, which makes it possible to introduce into the composite video signal for recording or for transmission, two absolute amplitude references, without modifying the information which it contains, one of which references is used at the time of read-out or at reception, in order to correct the amplitude of the read-out or received whole composite video signal (gain correction), while the other is used at said same time of read out or reception, to correct the amplitude of the higher frequency components in the spectrum of said read out or received signal relatively to that of the lower frequency components.

According to the invention there is provided a processing arrangement for processing, prior to transmission or recording, a video frequency composite colour television signal including horizontal sync. pulses, a chromonance information comprising a modulated chrominance sub-carrier outside the blanking intervals, and burst signals each of which is formed by a train of oscillations at the sub-carrier frequency and is transmitted in a horizontal blanking interval, and a picture signal, said arrangement comprising first and second processing circuits having respectives inputs for receiving said composite signal and respectives outputs, said first circuit comprising first selecting means for selecting said sync. pulses, and a first correcting circuit for receiving said sync. pulses and imparting thereto an amplitude equal to that of a first reference signal, said second circuit comprising second selecting means, having an output, for selecting an upper portion, including said chrominance information, of the frequency spectrum of said composite signal, at least when said chrominance information is formed by said burst signals, and a second correcting circuit for receiving the output signal from said second selecting means and giving it an amplitude which is a function of the amplitude of a second reference signal, said arrangement further comprising a mixer circuit having two inputs respectively coupled to said outputs of said first and second processing circuits, and an output for delivering a processed video frequency composite signal.

According to the invention there is further provided a device adapted for automatically correcting the amplitude of a composite video frequency signal, including horizontal sync. pulses, which has been processed by means of a processing arrangement as claimed in claim 1, said device comprising: an amplifier having a signal input for receiving said composite signal, a gain control input and an output; sampling means connected to said amplifier output, for sampling said horizontal sync. pulses; and a comparator having a first input coupled to said sampling means, a second input for receiving a reference signal for the amplitude of said horizontal sync. pulses and an output coupled to said control input; said amplifier output forming the output of said automatically correcting device.

The invention will be better understood and others of its features rendered apparent, from a consideration of the ensuing description and related drawings in which:

FIG. 1 illustrates the arrangement in accordance with the invention, applicable to a system for recording or transmitting colour television signals in accordance with the PAL or NTSC methods;

FIG. 2 illustrates the modified higher frequency part of the arrangement of FIG. 1, for operation according to the SECAM system;

FIG. 3 illustrates an automatic gain correcting device;

FIG. 4 illustrates a dual function system which makes it possible either to process the signal or to correct the signal if the latter has been processed already.

In FIG. 1, the input E is designed to be supplied with a composite video signal coming from a transmitter operating in accordance with the PAL or NTSC systems.

In accordance with these systems, the chrominance sub-carrier is amplitude-modulated (and phase-modulated) and the composite signal amplitudes which can be used to introduce the reference amplitudes, are exclusively:

- the fundamental amplitude of the horizontal sync. pulses;
- the amplitude of the bursts made up of oscillations at the frequency of the sub-carrier and transmitted in horizontal blanking intervals.

The arrangement shown in FIG. 1 enables two reference amplitudes to be introduced.

The input E is connected to an amplifier 1 comprising a circuit designed to restore the direct component of the composite video signal, the horizontal sync. pulses of the video signal being negative at the output of this amplifier. The output of the amplifier 1 is connected to the inputs $E_1$ and $E_2$ of two processing circuits respectively 100 and 200 (shown in broken line in the figure).

The input $E_1$ is connected to a low-pass filter 2, whose output delivers a signal having a spectrum corresponding to the lower frequencies up to the chrominance channel. The output of the filter 2 is connected to an amplitude splitter circuit 3 supplying at a first output those parts of its input signal which have positive amplitudes (luminance) and at a second output those parts of its input signal which have negative amplitudes, that is to say the horizontal sync. pulses. The first output is connected to a first input of an adder 4 and the second is connected to the input of a variable-gain amplifier 5 whose output is connected to the second input of the adder 4. The output of the adder is connected to the input of a sampling circuit of the holding type, i.e., memorizing the value of the last sample. The circuit 6 is supplied at a control input 99 with short sampling pulses coinciding, for example, with the centre of the sync. pulses.

The output of the sampling circuit 6 is connected to a first input of a differential amplifier 7 whose other input is connected to a bias voltage source supplying a reference signal of constant amplitude, which we will call the first reference signal (marked ref 1 in the figures).

This amplifier 7 is a comparator which produces an error signal characteristic of the difference between the amplitude of the sync. pulse and the amplitude of the first reference signal, this error signal remaining substantially constant during the period of a line.

The output signal from the amplifier 7 is applied to the control input of the variable-gain amplifier 5 and makes it possible to adjust the amplitude of the sync. pulses so that it is always equal to the amplitude of the first reference signal. The output of the adder circuit 4 constitutes the output $S_1$ of the circuit 100. This circuit therefore makes it possible to control the amplitude of the sync. pulses.

In addition, the output of the amplifier 1 is connected to the input $E_2$ of a circuit 200.

This circuit 200 comprises a filter 8 complementary to the low pass filter 2 and supplying the upper portion of the composite video signal of frequency spectrum. The output of this filter is connected to the input of an amplifier 9 with two outputs, switched by means of a gating signal which coincides with the bursts and is triggered by the trailing edges of the horiz. sync. pulses, and supplies the control input 98 of the amplifier 9. The first output of the amplifier 9, which is supplied in the absence of the gating signal, is connected to the input of an amplifier 11 having unit gain, whose output is connected to a first input of an adder 12. The second output of the switched amplifier, which is supplied when the gating signal is present, is connected to the input of a variable-gain amplifier 13 whose output is connected to a detector circuit 14 whose own output is connected to a sampling circuit 15 of the holding type, controlled by a short pulse derived from the burst gating signal through a circuit 10 comprising, for example, two series-connected monostable trigger circuits. The sampling circuit 15 is connected to one input of a differential amplifier 16 whose other input is supplied with a reference signal which we will call the second reference signal (marked ref 2 in the figures). The output of this amplifier 16 is connected to the gain control input of the variable-gain amplifier 13.

The output of the adder 12 constitutes the output $S_2$ of the circuit 200. The outputs $S_1$ and $S_2$ of the circuits, respectively 100 and 200, are connected to the two inputs of a mixer 17 which makes it possible to reconstitute the composite video signal, the circuit 100, by means of the sync. pulse amplitude, having introduced a first reference amplitude for the whole composite video signal, and the circuit 200, by means of the burst signal amplitude, having introduced a second reference amplitude for the higher frequencies, of the composite video signal spectrum.

In a colour television system operating on the SECAM principle, the sub-carrier (which has two different resting frequencies $f_{OB}$ and $f_{OR}$ for the blue and red chrominances) is frequency modulated. Its amplitude at the output of the modulator is constant. However, in order to improve the signal-to-noise ratio for the higher frequencies of the modulating signal, this modulated signal is transmitted after being passed through a sub-carrier frequency pre-emphasis filter which boosts the amplitude of the lateral components of the spectrum in relation to that of the central frequencies.

This introduces amplitude modulation of the sub-carrier. The fixed reference used here for the higher frequencies in the signal, will be the amplitude of the sub-carrier after it has passed through a sub-carrier frequency de-emphasis filter comparating the aforementioned pre-emphasis.

The circuit 200 of FIG. 2 plays, for the SECAM system, the part previously played by the circuit 200 of FIG. 1 for the NTSC or PAL systems. Similar elements are given similar references in these two figures.

The input $E_2$ is connected to a filter 8 which essentially filters the chrominance signal. This filter is connected to the input of a variable-gain amplifier 13 whose output is connected to the input of a sub-carrier frequency de-emphasis filter 18. The output signal from this filter is detected by a detector circuit 14 and the detected signal is sampled by a sampling and holding circuit 15 controlled on its control input 97 by short pulses at the line frequences produced during the back porches of the horizontal blanking signals, the sub-carrier then having its resting frequency ($f_{OR}$ or $f_{OB}$ depending upon the lines). The output signal from the sampling circuit 15 is compared with a reference signal (second reference signal) by means of a differential amplifier 16 whose output signal, characteristic of the amplitude difference between the second reference signal and the amplitude of the chrominance sub-carrier, is applied to the control input of the variable-gain amplifier 13.

Part of the correcting device corresponding to the processing arrangement hereinabove described has been shown in FIG. 3.

In this figure, the processed video frequency signal (that is to say into which the amplitude reference signals have been introduced) available at the output of the demodulator, is applied to the input $E_3$ of a clamping circuit 30 which restores the direct component of the video frequency signal. This amplifier 30 is connected to a variable-gain amplifier 31 whose output $S_3$ is connected to a sampling and holding circuit 32 controlled for a fraction of the time of the horizontal sync. pulses by a pulse applied to its control input 96. The output of the circuit 32 is connected to a comparator 33 which is supplied with a constant voltage corresponding to the amplitude of the first reference signal, and delivers an error signal characteristic of the difference between the true amplitude of the sync. pulses and the amplitude of the first reference signal. This error signal is applied to the control input of the variable-gain amplifier 31. Thus, it is the whole composite video signal which is corrected as a function of the variation which the amplitude of the horizontal sync. pulse undergoes during transmission or reconstitution (in the case of a recorded video signal) of this video frequency signal.

The signal appearing at the output of the amplifier 31 may likewise be applied to a circuit of the "autochroma" kind which makes it possible, after detection of the error signal obtained by correcting the amplitudes of the burst and the second reference signal, to correct the gain within the chrominance band in order to obtain a flat amplitude-frequency response throughout the band width of the video frequency signal. This device does not form part of the object of the invention, however, and has not therefore been described in detail.

It is also possible to directly control the gain of the demodulator itself and thus to dispense with the variable-gain amplifier 31.

FIG. 4 illustrates a dual function system which makes it possible to correct the input composite video signal or to process it, depending upon whether the signal has or has not already been processed.

For this purpose, the processing arrangement (as shown in FIGS. 1 and 2) and a correcting device (not described in detail) are alternately rendered operative by means of an associated circuit whose function is a dual one; (i) if the composite video signal supplied at the input has not already been processed in order to introduce the correct amplitude references, processing will be accompanied by the introduction of an auxiliary signal which will be referred to as the test signal, characteristic of a processed composite video signal; (ii) if the test signal is present in the input composite video signal, then said composite video signal will then be directed to the correcting device.

In FIG. 4, the video frequency signal is applied to the input 20. This input 20 is connected through an electronic switch 21 to the input E of a processing device 22 identical to the processing arrangement in accordance with FIG. 1 for the PAL and NTSC systems or FIG. 2 for the SECAM system.

This device 22 is connected to a test pulse circuit 23 which makes it possible to introduce into a line available during the vertical blanking intervals, a characteristic test pulse, for example a 30 microsecond pulse in line 19 of the vertical blanking interval, this pulse having a suitable level. These pulses, at the field frequency, are applied to the input 28.

An electronic switch 24 connects the output of the circuit 23 to the output $S_4$ of the system.

The input 20 of the system is also connected to a coincidence gate 26 which delivers a signal when the test pulse, occurring in line 19 of the vertical blanking interval, and the signal at the input 28, coincide. The output of this coincidence gate controls the switches 21 and 24. If no pulse is detected, the switches 21 and 24 remain in position 1, that is to say that the video frequency signal is applied to the processing device 22 and the output of the circuit 23 is connected to the output of the system. By contrast, if a pulse is detected, the switches are placed in position 2 for a duration slightly longer than a field period, that is to say that the video frequency signal is applied to a correcting device 27 which makes it possible, from the two reference amplitudes, to correct the video frequency signal, the switch 24 then connecting the output of the correcting device 27 to the output of the system.

The invention is not limited to the embodiments described and illustrated here.

In particular, instead of correcting the level of the horizontal sync. pulses existing in the complete video frequency signal, it is possible to suppress them by clipping the negative parts of this signal, and to replace them by pulses of amplitude equal to the amplitude of the first reference signal. The two modes are equivalent to one another and the choice depends upon the circuit design.

What is claimed is:

1. A processing arrangement for processing, prior to transmission or recording, a video frequency composite colour television signal including: horizontal sync. pulses, a chrominance information comprising a modulated chrominance sub-carrier outside the blanking intervals, and burst signals each of which is formed by a train of oscillations at the sub-carrier frequency and is transmitted in a horizontal blanking interval, and a picture signal, said arrangement comprising first and second processing circuits having respective inputs for receiving said composite signal, and respective outputs, said first circuit comprising first selecting means for selecting said sync. pulses, and a first correcting circuit for receiving said sync. pulses and imparting thereto a predetermined amplitude, said second circuit comprising second selecting means, having an output, for selecting an upper portion, including said chrominance information, of the frequency spectrum of said composite signal, at least when said chrominance information is formed by said burst signals, and a second correcting circuit for receiving the output signal from said second selecting means and giving it a predetermined amplitude, said arrangement further comprising a mixer circuit having two inputs respectively coupled to said outputs of said first and second processing circuits, and an output for delivering a processed video frequency composite signal.

2. A processing arrangement as claimed in claim 1, wherein said first selecting means comprises a low pass filter, having an output, for selecting the lower portion, complementary to said upper portion, of said frequency spectrum, and an amplitude splitter having first and second outputs, and an input coupled to said filter output, for separating the horizontal sync. pulses from the other components of the output signal from said filter and directing said pulses to said splitter first output and said others components to said splitter second output; and wherein said first correcting circuit comprises: an amplifier having an output, a gain control input and a signal input connected to said splitter first output; generating means, having an output, for supplying pulses coinciding with said sync. pulses; a source having an output for supplying a bias voltage having the nominal amplitude of said sync. pulses; an adder circuit having two inputs, respectively connected to said splitter second output and to said amplifier output, and an output forming the output of said first processing circuit; sampling means having a control input connected to said output of said generating means, a signal input connected to said adder output, and an output; and a comparator having a first input coupled to said sampling means output, a second input connected to said output of said source, and an output coupled to said gain control input.

3. A processing arrangement as claimed in claim 1, for processing a composite colour signal including an amplitude-modulated chrominance sub-carrier, wherein said second selecting means comprise: a filter, having an output, for selecting said upper portion of said frequency spectrum, first and second outputs; first generating means supplying a gating signal coinciding with said burst signals; and switching means, controlled by said gating signal, for directing the output signal from said filter either to said first or to said second output of said second selecting means according to whether said output signal includes or not oscillations of one of said burst signals; and wherein said second correcting circuit comprises: a first amplifier having a signal input connected to said first output, a gain control input, and an output; a second amplifier having a signal input connected to said second output, and an output; second generating means, having an output, for supplying a short pulse derived from said gating signal; a source having an output for suppling a bias voltage having the nominal amplitude of said oscillations; an adder having two inputs respectively coupled to said outputs of said first and second amplifiers, and an output forming said output of said second processing circuit; a detector having an input coupled to said output of said adder and an output; sampling means having a control input connected to said output of said second generating means, a signal input connected to said detector output, and an output; and a comparator having a first input coupled to said sampling means output, a second input connected to said output of said source, and an output coupled to said gain control input.

4. A processing arrangement as claimed in claim 1, for processing a composite signal including a chrominance sub-carrier frequency modulated by the chrominance information and amplitude modulated by means of a sub-carrier frequency pre-emphasis filter, wherein said second selecting means comprise a filter, having an output, for selecting said upper portion of said frequency spectrum, and wherein said second correcting circuit comprises: an amplifier having a signal input connected to said filter output, a gain control input and an output forming said second processing circuit output; a de-emphasis filter having an input connected to said amplifier output; a detector circuit having an output, for detecting the output signal from said de-emphasis filter; means for generating sampling pulses in the course of the back porche of each horizontal blanking interval; a source having an output for supplying a bias voltage having the nominal amplitude of said sync. pulses; a sampling means, having a trigger input coupled to said generating means output, a signal input coupled to said detector output and an output; a comparator having a first input connected to said sampling means output, a second input connected to said output of said source and an output coupled to said gain control input.

5. A processing arrangement as claimed in claim 1, further comprising a test pulse circuit for introducing into a predetermined available line of each one of the vertical blanking intervals of the processed composite video fequency signal, a test pulse when this signal has been processed.

6. A device adapted for automatically correcting the amplitude of a composite video frequency signal, including horizontal sync. pulses, which has been processed by means of a processing arrangement as claimed in claim 1, said device comprising: an amplifier having a signal input for receiving said composite signal, a gain control input and an output; generating means, having an output, for supplying pulses coinciding with said sync. pulses; a source having an output for supplying a bias voltage having the nominal amplitude of said sync. pulses; sampling means, for sampling said horizontal sync. pulses, having a trigger input coupled to said output of said generating means, a signal input connected to said amplifier output, and an output; and a comparator having a first input coupled to said sampling means output, a second input coupled to said output of said source, and an output coupled to said control input; said amplifier output forming the output of said automatically correcting device.

* * * * *